(12) United States Patent
Burra et al.

(10) Patent No.: US 7,952,232 B2
(45) Date of Patent: May 31, 2011

(54) WIND TURBINE ENERGY STORAGE AND FREQUENCY CONTROL

(75) Inventors: Rajni Kant Burra, Bangalore (IN); Robert William Delmerico, Clifton Park, NY (US); Ralph Teichmann, Niskayuna, NY (US); Abhitap Jain, Rajasthan (IN); Mark Shu, Albany, NY (US)

(73) Assignee: General Electric Company, Niskayuna, NY (US)

( * ) Notice: Subject to any disclaimer, the term of this patent is extended or adjusted under 35 U.S.C. 154(b) by 211 days.

(21) Appl. No.: 12/047,394

(22) Filed: Mar. 13, 2008

(65) Prior Publication Data
US 2009/0230689 A1 Sep. 17, 2009

(51) Int. Cl.
*H02P 9/04* (2006.01)
*H02J 9/00* (2006.01)
(52) U.S. Cl. ............... 307/64; 307/18; 290/44; 290/55
(58) Field of Classification Search .............. 290/55, 290/44
See application file for complete search history.

(56) References Cited

U.S. PATENT DOCUMENTS

| | | | |
|---|---|---|---|
| 2,230,526 A * | 2/1941 | Claytor | 290/44 |
| 5,198,698 A * | 3/1993 | Paul et al. | 307/64 |
| 5,225,712 A | 7/1993 | Erdman | |
| 5,369,353 A | 11/1994 | Erdman | |
| 5,907,192 A | 5/1999 | Lyons et al. | |
| 6,420,796 B1 | 7/2002 | Lagerwey | |
| 6,921,985 B2 | 7/2005 | Janssen et al. | |
| 7,126,236 B2 * | 10/2006 | Harbourt et al. | 290/44 |
| 7,218,012 B1 | 5/2007 | Edenfeld | |
| 7,391,126 B2 * | 6/2008 | Liu et al. | 290/44 |
| 7,449,794 B2 * | 11/2008 | Guey et al. | 290/44 |
| 7,518,257 B2 * | 4/2009 | Guey et al. | 290/44 |
| 7,566,981 B2 * | 7/2009 | Kunkel et al. | 290/44 |
| 2003/0231009 A1 * | 12/2003 | Nemoto et al. | 323/276 |
| 2004/0100229 A1 | 5/2004 | Wobben | |
| 2006/0208493 A1 * | 9/2006 | Harbourt et al. | 290/44 |
| 2007/0057516 A1 * | 3/2007 | Mever et al. | 290/44 |
| 2007/0080666 A1 * | 4/2007 | Ritter et al. | 320/128 |
| 2008/0067872 A1 * | 3/2008 | Moth | 307/66 |
| 2009/0021963 A1 * | 1/2009 | Andresen et al. | 363/37 |
| 2009/0066089 A1 * | 3/2009 | Arinaga et al. | 290/55 |

(Continued)

FOREIGN PATENT DOCUMENTS

DE 102004005169 B3 * 11/2005

(Continued)

OTHER PUBLICATIONS

Ralph Teichmann et al., "Method, Apparatus and Computer Program Product for Wind Turbine Start-Up and Operation Without Grid Power," U.S. Appl. No. 11/538,618, filed Oct. 4, 2006.

(Continued)

*Primary Examiner* — Joseph Waks
(74) *Attorney, Agent, or Firm* — Ann M. Agosti

(57) ABSTRACT

Commands are generated for controlling a state of charge of an energy storage device coupled between an energy source and an auxiliary load. Commands are also generated for providing from the energy storage device to the auxiliary load and for using power from the energy storage device for controlling a DC link voltage, energy source torque, grid side power flow, or combinations thereof. Commands may also be generated to provide frequency compatible power to auxiliary loads of the energy source.

12 Claims, 5 Drawing Sheets

U.S. PATENT DOCUMENTS

2009/0102291 A1 * 4/2009 Mazumder et al. ............ 307/80

FOREIGN PATENT DOCUMENTS

| EP | 1763126 A1 | * | 3/2007 |
|----|------------|---|--------|
| JP | 04325832 A | * | 11/1992 |
| WO | 9618937 | | 6/1996 |
| WO | 0244561 | | 6/2002 |
| WO | 2005017350 | | 2/2005 |
| WO | 2005113964 | | 12/2005 |
| WO | WO 2007132303 A1 | * | 11/2007 |

OTHER PUBLICATIONS

Robert William Delmerico et al., "Power Generation Stabilization Control Systems and Methods," U.S. Appl. No. 12/023,368, filed Jan. 31, 2008.

* cited by examiner

WIND TURBINE ENERGY STORAGE AND FREQUENCY CONTROL

BACKGROUND

The invention relates generally to energy storage and more specifically to the use of energy storage for multiple purposes of renewable energy sources. The invention additionally relates to wind turbines and more specifically to grid frequency flexibility in wind turbine electrical systems.

Wind turbines have bladed rotors which are connected to electrical generators by shafts. Examples of electrical generators include doubly fed induction generators (DFIGs) and permanent magnet (PM) generators. In order to feed the electrical power to the grid, power electronics elements are used for power conditioning. In one example, the power electronics elements include back-to-back voltage source converters connected to a DC link. For a DFIG, stator terminals of the generator are directly connected to the grid, and the power electronics is connected between the rotor and stator terminals. For a PM machine, AC machine terminals are connected via the power electronics.

As new grid codes are developed for wind farms, and as market penetration level of wind farms increases, variability of wind power is becoming less acceptable to utility companies. For example, utility companies are imposing or expected to impose requirements related to power ramp rate limits, low voltage ride through, power-frequency control, inertial response, and curtailment.

It would be desirable to have a system and method to efficiently address variability of wind power to help satisfy the related utility company requirements.

Wind turbines are typically designed and specified for a specific grid frequency such as 50 Hz or 60 Hz. At least two configurations are developed for each wind turbine type with one being applicable to 50 Hz and the other being applicable to 60 Hz. Typically an initial design is done for the one grid frequency and then modified for the second grid frequency. Both designs have to be certified independently. Design, engineering, parts procurement, spare parts, and training requirements are thus increased by the need for the second design and certification.

It would be desirable to have a wind turbine electrical system design that allows a flexible installation of the wind turbine regardless of grid frequency.

BRIEF DESCRIPTION

Briefly, in accordance with one embodiment disclosed herein, an energy storage system comprises: an uninterruptible power supply (UPS) system comprising an energy storage device coupled between an energy source and an auxiliary load of the energy source; and a control system configured for generating commands for controlling a state of charge of the energy storage device, providing power from the energy storage device to the auxiliary load, and using power from the energy storage device for controlling a DC link voltage, energy source torque, grid side power flow, or combinations thereof.

In accordance with another embodiment disclosed herein, a method comprises: generating commands for controlling a state of charge of an energy storage device coupled between an energy source and an auxiliary load of the energy source; providing power from the energy storage device to the auxiliary load; and using power from the energy storage device for controlling a DC link voltage, energy source torque, grid side power flow, or combinations thereof.

In accordance with another embodiment disclosed herein, a wind turbine comprises: a plurality of auxiliary wind turbine loads; an auxiliary load converter; and a control system configured to switch elements of the auxiliary load converter to provide frequency compatible power to the auxiliary loads.

DRAWINGS

These and other features, aspects, and advantages of the present invention will become better understood when the following detailed description is read with reference to the accompanying drawings in which like characters represent like parts throughout the drawings, wherein.

Figure 3:
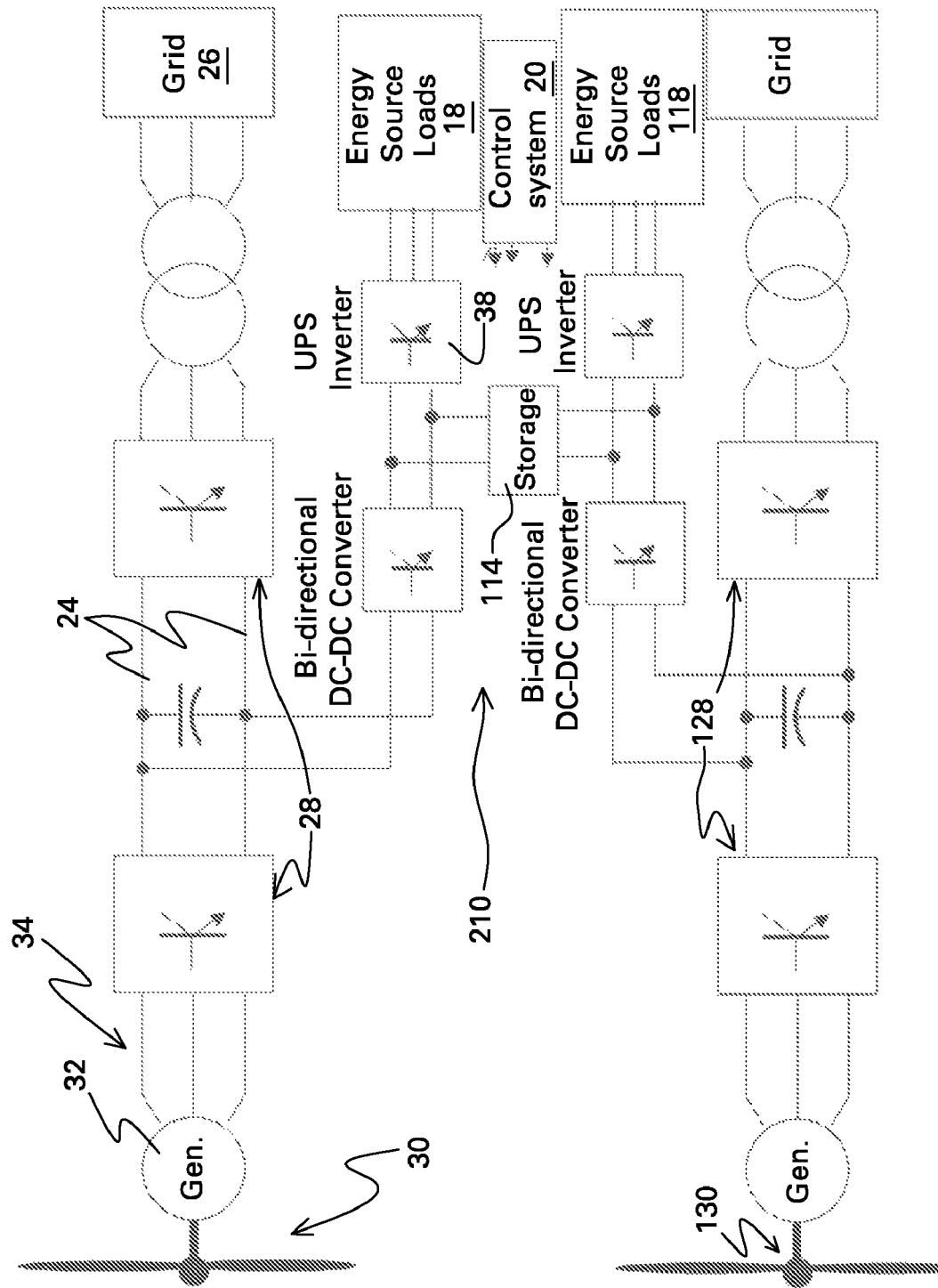

FIG. 3 a block diagram of an energy storage system in accordance with another embodiment disclosed herein.

Figure 4:
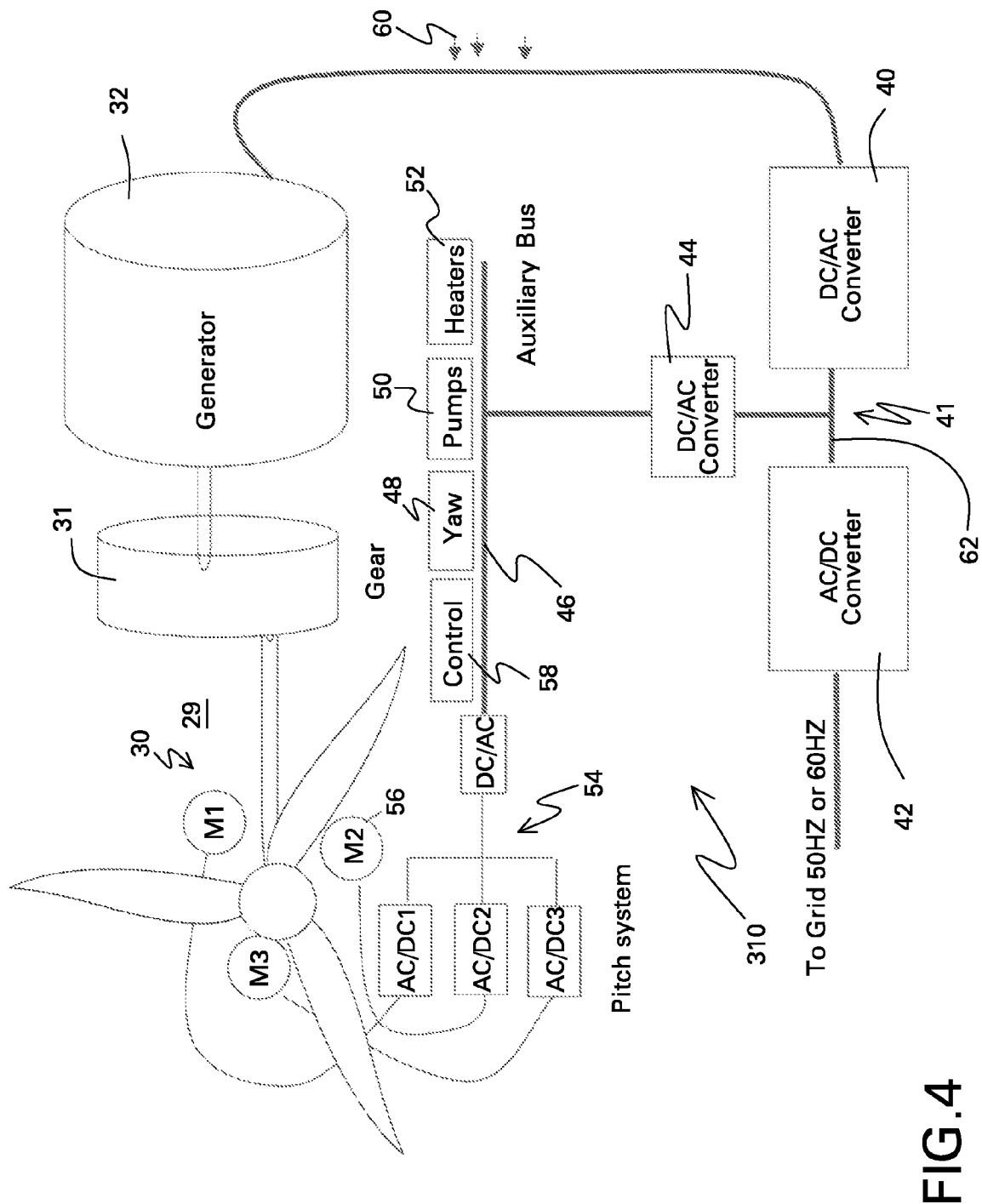

FIG. 4 is a block diagram of a frequency flexible electrical system in accordance with one embodiment disclosed herein.

Figure 5:
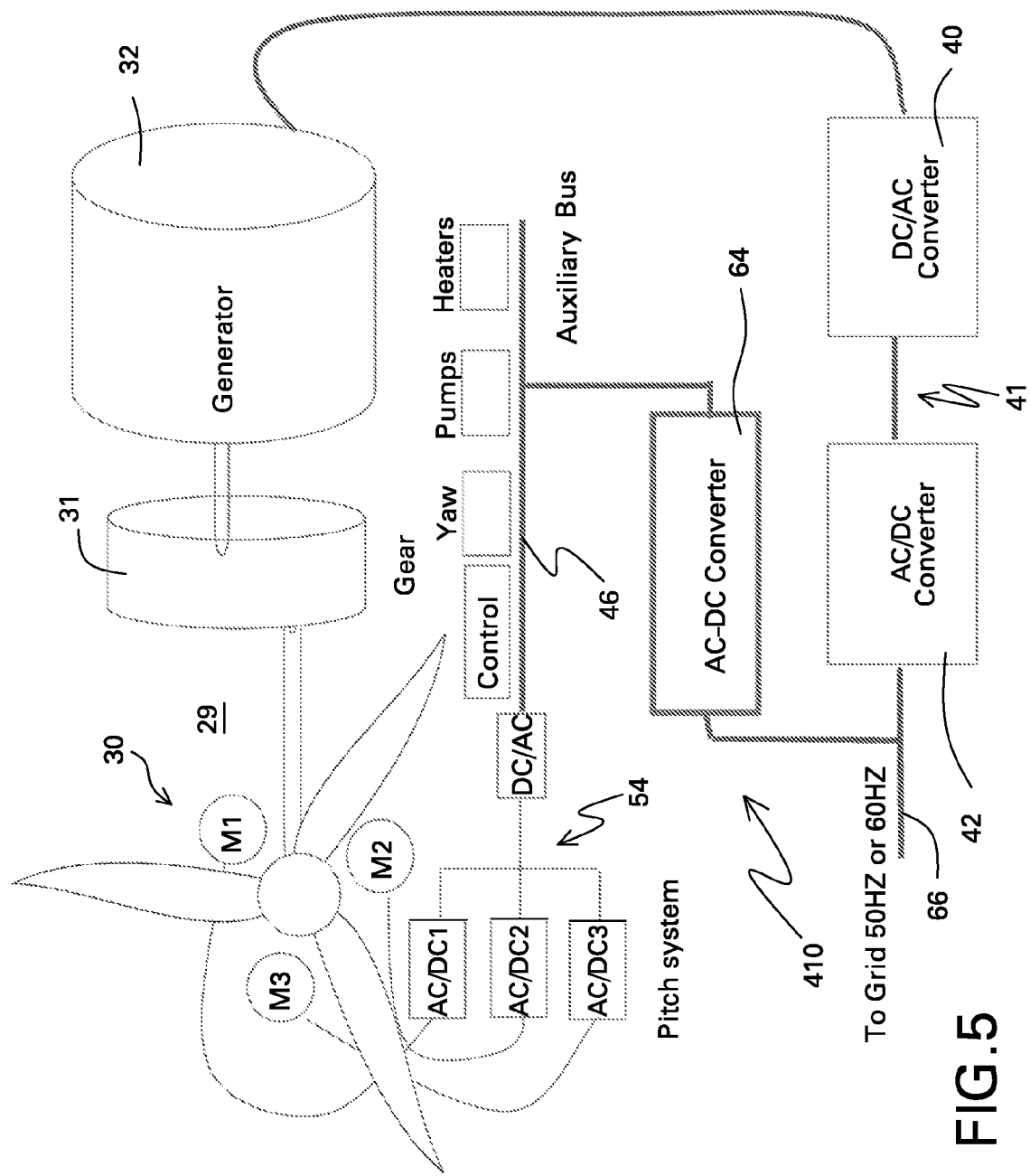

FIG. 5 is a block diagram of another frequency flexible electrical system in accordance with another embodiment disclosed herein.

DETAILED DESCRIPTION

In embodiments described herein, dual-use energy storage is added to energy sources, particularly renewable energy sources such as wind turbines 30 (shown in FIG. 1), for enhanced performance and energy capture. Wind turbines typically already include uninterruptible power supply (UPS) equipment with energy storage for critical bus loads. Embodiments disclosed herein use storage to support the critical bus loads and other auxiliary loads as well as to provide power support for a power conversion system supplying power from the energy source to a network or grid. As used herein "a," "an," and other forms of the singular are meant to encompass one or more elements unless clearly indicated otherwise.

Figure 1:
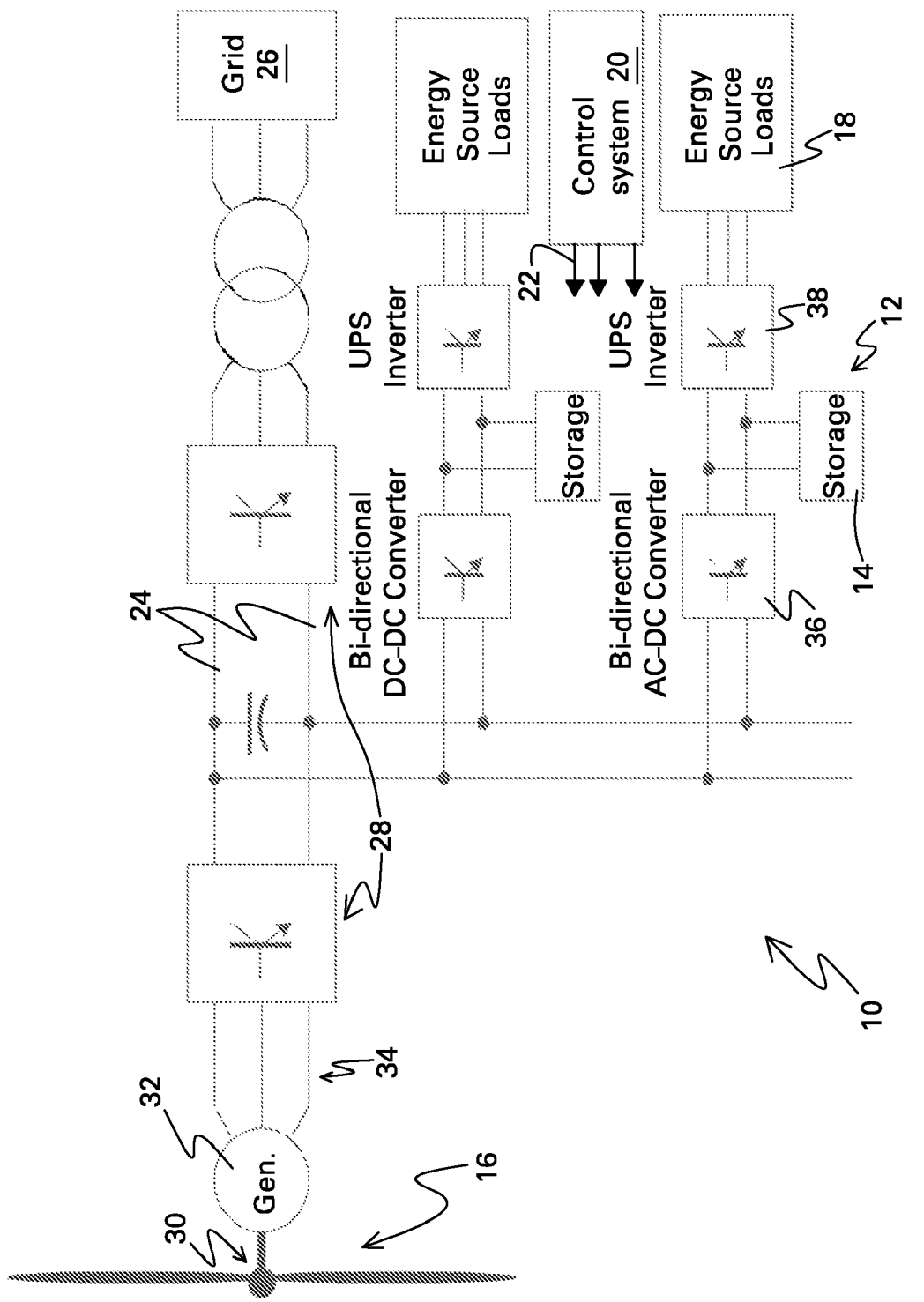
FIG. 1 is a block diagram of an energy storage system in accordance with one embodiment disclosed herein.

FIG. 1, for example, is a block diagram of an energy storage system 10 comprising: an uninterruptible power supply (UPS) system 12 comprising an energy storage device 14 coupled between an energy source 16 and an auxiliary load 18 of energy source 16; and a control system 20 configured for generating commands 22 for controlling a state of charge of energy storage device 14, providing power from energy storage device 14 to auxiliary load 18, and using power from energy storage device 14 for controlling a DC link 24 voltage, energy source torque, grid 26 side power flow, or combinations thereof. Auxiliary load 18 typically comprises at least one load that is needed to support operation of the energy source. Several examples of such loads in a wind turbine embodiment include yaw drives, pumps, temperature regulators, and pitch control motors 56 (FIG. 4). Other examples include monitoring and diagnostic equipment and lighting equipment (not shown).

FIG. 1 additionally illustrates energy storage device 14 as coupled between a power conversion system 28 of energy source 16 and auxiliary load 18. "Between" as used in this context is meant to cover that the coupling of energy storage device 14 is to auxiliary load 18 at one end and to power conversion system 28 at the other end. The coupling to power conversion system 28 may be at either end of power conversion system 28 or at the DC link 24 of power conversion system 28. In the embodiment of FIG. 1, for example, generator 32 couples wind turbine 30 to power conversion system 28, and energy storage device 14 is coupled between DC link 24 of power conversion system 28 and auxiliary load 18. In a more specific embodiment, UPS system 12 comprises a bi-directional converter 36 coupled to the power conversion system 28 and a UPS inverter 38 coupled to the auxiliary load, and the energy storage device 14 is coupled between the bi-directional converter and the UPS inverter.

Energy storage device 14 may comprise any desired storage device with its storage capacity being dependent upon system requirements. Several examples include an ultracapacitor, an electrochemical battery, a fuel cell, and a flywheel. Additionally, combinations of such devices may be used. Control of the state-of-charge is done to attempt to prevent a circumstance in which the energy storage device is charged so fully that no more capability is available to absorb energy and to prevent the reverse circumstance of not having enough charge to meet system requirements. State-of-charge targets will vary with application and operating conditions of energy source 16.

Figure 2:
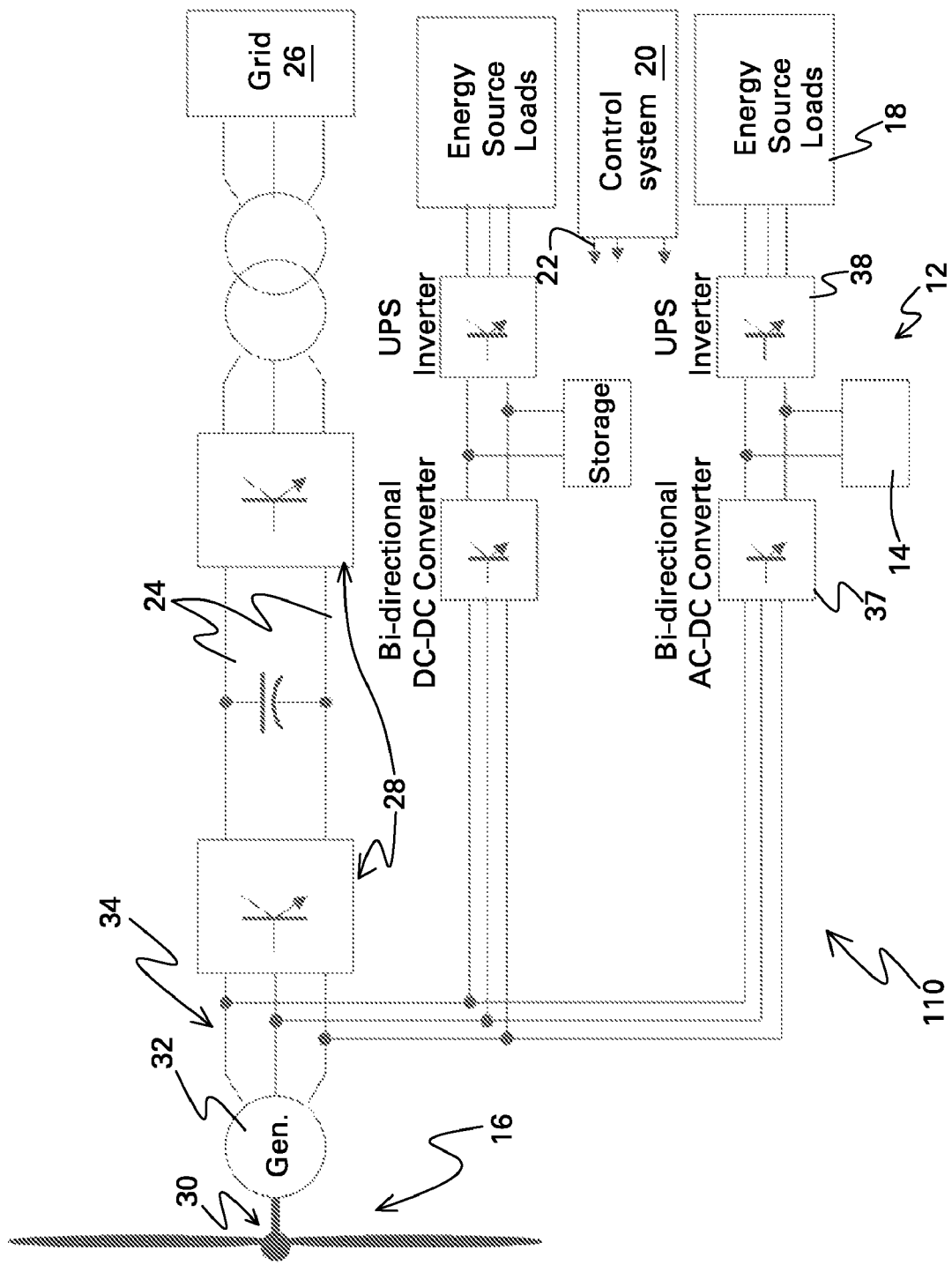
FIG. 2 is a block diagram of an energy storage system in accordance with another embodiment disclosed herein.

FIG. 2 is a block diagram of an energy storage system 110 in accordance with another embodiment wherein energy storage device 14 is coupled to AC connections 34 between generator 32 and power conversion system 28. In this embodiment, an AC-to-DC converter 37 is used to convert the AC power into a constant DC voltage for use by the energy source auxiliary loads.

FIG. 3 is a block diagram of an energy storage system 210 in accordance with another embodiment wherein energy source 16 comprises a plurality of wind turbines 30, 130. One storage unit 114 may be coupled to multiple wind turbines, as shown in FIG. 3. Additionally, multiple storage units may be coupled to one or more wind turbines as shown in FIGS. 1 and 2. Control system 20, when providing commands for supplying power, may be programmed based on priorities of the auxiliary load 18, 118 requirements and the power conversion system 28, 128 support requirements. This balancing of priorities may become more challenging as the number of energy sources coupled to a single energy storage device or a bank of energy storage devices increases.

The above embodiments have been described in reference to a system but are also applicable to control methods. For example, in one embodiment related to that shown in FIG. 1, a method comprises: generating commands 22 for controlling a state of charge of an energy storage device 14 coupled between an energy source 16 and an auxiliary load 18; providing power from the energy storage device to the auxiliary load; and using power from the energy storage device for controlling a DC link 24 voltage, energy source torque, grid 26 side power flow, or combinations thereof.

By using selected embodiments disclosed herein for energy storage and control, utility requirements can more effectively be addressed. With respect to wind farms, if a sufficient amount of energy storage is used, then the farms will be able to mitigate wind intermittency for both grid connected and islanded operation.

As an example of controlling grid-side power flow, power ramp rate limits are typically maintained by pitching wind turbine blades as wind speed and power increase (in other words, by curtailment). As long as the state-of-charge of the energy storage device is below an upper limit, the energy storage device may instead be used to absorb some of the excess energy. In contrast, when wind speed and power output from the wind turbine decreases without energy storage, there is no effective way to control the power drop off to the grid. If the storage is sized correctly, it can be used to control the drop off ramp in addition to providing the UPS supply.

As another example, with respect to controlling generator torque, when a grid fault occurs such that a wind turbine cannot push power to the grid, the breaking torque (applied to the generator by the power conversion system 28) goes through a rapid transition from a nominal value to a near zero value if no mitigation is in place. The sudden change in torque has adverse effects on the gear box (such as gear box 31 of FIG. 4) and on the shaft. If the torque is suddenly reduced, the shaft will go through a torsional transient that negatively impacts the gearbox life and will cause the shaft to accelerate. Conventional mitigation of such transients involves adding a breaking resistor to the grid side converter so that the power is temporarily diverted to the resistor to help temporarily maintain the torque. Using energy storage could eliminate the resistor, and it would be beneficial to instead capture the energy through the energy storage device and enable low voltage ride-through.

In an example relating to controlling DC link voltage, stability issues may be addressed in weak grid applications. During high speed interaction between control loops of an energy source and a power grid, stability issues occur if the control loops interact with a weak electrical network of the grid. Under these circumstances, DC link voltage may oscillate. By providing energy from the energy storage device in a manner to result in a stiff DC link, the compounding is reduced.

Power frequency control is another concern of utilities. As the grid frequency changes, a conventional response is to pitch the blades so as to temporarily spill wind and decrease the wind turbine output. Having energy storage capacity can reduce the need to quickly pitch the blades.

Another feature of interest to utilities is inertial response. Conventional synchronous generators naturally respond to frequency disturbances due to rotating inertia of such generators. Some utility operators require that wind turbines respond in a similar way to frequency disturbances. Specifically a short duration power increase (for example, five percent of rated power) may be needed when frequency dips below a threshold. One technique for addressing these issues that does not require the use of energy storage is described in commonly assigned application Ser. No. 12/023,368, filed Jan. 31, 2008, which is herein incorporated by reference and which describes a power shaper configured for providing a transient power generation adjustment signal. Energy storage concepts disclosed in the present application may be useful for providing flexibility in generating and supplying power for such adjustment signals.

The embodiments disclosed herein may additionally be beneficial to power fluctuations and flicker due to wind turbulence by using the energy storage device to smooth the power by absorbing the wind turbulence into energy storage and supplying energy when needed to provide more constant power.

FIG. 4 is a block diagram of a grid frequency flexible electrical system 310 in accordance with one embodiment disclosed herein which may be used in combination with the above disclosed embodiments or as a separate embodiment. In this embodiment, wind turbine assembly 29 comprises: a plurality of auxiliary wind turbine loads 48, 50, 52, 56; a power conversion system 41; and a control system 58 configured to generate commands 60 to switch elements of an auxiliary load converter 44 to provide frequency compatible power to the auxiliary loads. In one embodiment, power having substantially constant frequency and voltage is provided to a common auxiliary bus 46. At least some of the auxiliary wind turbine loads are coupled to the common auxiliary bus. In the example of FIG. 4, some of the auxiliary wind turbine loads (such as, for example, yaw drive 48, pumps 50, temperature regulators 52, and pitch system 54) are coupled directly to the common auxiliary bus.

The embodiment of FIG. 4 additionally illustrates an auxiliary load converter 44 coupled between common auxiliary bus 46 and a DC link 62 of converters 40 and 42 of power conversion system 41. The connection to the DC link may be used to provide a short term energy storage. FIG. 5 illustrates an alternative embodiment 410 wherein the auxiliary load converter 64 is coupled to an AC grid link 66 of the power conversion system.

The embodiments of FIG. 4 and FIG. 5 are useful for enabling a global wind turbine design that is adaptable to provide high quality power to sensitive control equipment and that does not require auxiliary load parts for different grid frequencies and thus are useful for providing economies of scale, non-recurring engineering savings, spare part management, simplified service procedures, and rapid global deployment. In a similar manner as discussed above, the energy source may comprise one or more wind turbines 30. Additionally, one or more energy storage units of the type discussed above may also be incorporated (such as, for example, by causing UPS inverter 38 of FIG. 1 to be switched in the manner discussed with respect to auxiliary load converter 44 of FIG. 4).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An energy storage system comprising:
  (a) an uninterruptible power supply (UPS) system comprising:
   (i) an energy storage device;
   (ii) a bi-directional converter coupled across a source DC link of a power conversion system of an energy source;
   (iii) a UPS inverter coupled to an auxiliary load of the energy source; and
   (iv) a UPS DC link coupling the bi-directional converter and the UPS inverter, wherein the energy storage device is coupled to the UPS DC link; and
  (b) a control system configured for generating commands for controlling a state of charge of the energy storage device and providing power from the energy storage device to the auxiliary load.

2. The energy storage system of claim 1 wherein the auxiliary load comprises at least one load that is needed to support operation of the energy source.

3. The energy storage system of claim 1 wherein the control system is further configured for generating commands for providing energy from the energy source to the energy storage device upon the occurrence of excess power being supplied by the energy source.

4. The energy storage system of claim 1 wherein the energy source comprises a wind turbine.

5. The energy storage system of claim 4 wherein the energy source further comprises a generator coupled between the wind turbine and the power conversion system, and wherein the energy storage device is coupled to AC connections between the generator and the power conversion system.

6. The energy storage system of claim 4 wherein the energy source comprises a plurality of wind turbines.

7. The energy storage system of claim 1 wherein the load comprises a plurality of auxiliary loads of the energy source, and wherein the controller is further configured to switch elements of the UPS system to provide frequency compatible power to the auxiliary loads.

8. The energy storage system of claim 1 wherein the energy storage device comprises an ultracapacitor, an electrochemical battery, a fuel cell, a flywheel, or combinations thereof.

9. A method comprising:
  coupling a bi-directional converter across a source DC link of a power conversion system of an energy source;
  coupling a UPS inverter to an auxiliary load;
  coupling a UPS DC link between the bi-directional converter, the UPS inverter, and an energy storage device; and
  providing power from the energy storage device to the auxiliary load.

10. The method of claim 9 wherein the energy source comprises a wind turbine.

11. The method of claim 10 wherein the energy source comprises a plurality of wind turbines.

12. The method of claim 10 wherein using the power additionally comprises addressing at least one utility requirement from the group consisting of power ramp rate limits, low voltage ride through, power-frequency control, inertial response, power smoothing, and curtailment.

* * * * *